(12) United States Patent
Saguchi et al.

(10) Patent No.: US 10,986,829 B2
(45) Date of Patent: Apr. 27, 2021

(54) ANNULAR SUSTAINED RELEASE PREPARATION AND PRODUCTION METHOD THEREOF

(71) Applicant: Shin-Etsu Chemical Co., Ltd., Tokyo (JP)

(72) Inventors: Ryuichi Saguchi, Niigata-ken (JP); Takehiko Fukumoto, Niigata-ken (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 187 days.

(21) Appl. No.: 16/058,030

(22) Filed: Aug. 8, 2018

(65) Prior Publication Data
US 2019/0000063 A1    Jan. 3, 2019

Related U.S. Application Data

(62) Division of application No. 13/634,734, filed as application No. PCT/JP2011/057513 on Mar. 22, 2011, now Pat. No. 10,117,426.

(30) Foreign Application Priority Data

Mar. 24, 2010   (JP) .................................. 2010-067537

(51) Int. Cl.
  *A01M 1/20*    (2006.01)
(52) U.S. Cl.
  CPC ................. *A01M 1/2044* (2013.01)
(58) Field of Classification Search
  CPC ..... B65D 85/36; A47L 16/4445; B65B 3/022; B65B 51/10; B65B 51/26; B29C 66/80; B29C 57/10; A01M 1/2044
  (Continued)

(56) References Cited

U.S. PATENT DOCUMENTS 4,600,146 A    7/1986  Ohno
4,687,663 A    8/1987  Schaeffer
(Continued)

FOREIGN PATENT DOCUMENTS

AU    2008 100 886 A4    10/2008
AU    2010100576 A4      7/2010
(Continued)

OTHER PUBLICATIONS

Office Action for Brazilian Patent Application No. BR112012022933-8 dated Oct. 16, 2018, 18 pages.
(Continued)

*Primary Examiner* — Hemant Desai
*Assistant Examiner* — Christopher Robin Kim
(74) *Attorney, Agent, or Firm* — Rimon, P.C.

(57) ABSTRACT

Provided is an annular sustained release preparation to be used by opening a center portion thereof, the preparation having a strength enough to avoid cleaving at a welded end portion. More specifically, provided is an annular sustained release preparation having at least two polymer tubes having both ends sealed and integrated by pressure-welding or at least one polymer tube and at least one polymer rod having both ends sealed and integrated by pressure-welding; and a sex pheromone liquid contained by at least one of the tubes or the tube; wherein an annular space can be formed by pulling the tubes or the tube and the rod apart from each other at a center portion therebetween, the central portion not having been pressure-welded; and an angle formed between a line connecting respective centers of diameters of the tubes welded to each other or the tube and the rod welded to each other and the pressure application direction is from 0 to 45°.

3 Claims, 9 Drawing Sheets

(58) Field of Classification Search
USPC .......... 206/0.5, 525; 53/476, 477, 452–454,
53/469; 424/400, 403; 156/218
See application file for complete search history.

(56) References Cited

U.S. PATENT DOCUMENTS

| | | | |
|---|---|---|---|
| 4,923,119 | A | 5/1990 | Yamamoto et al. |
| D369,094 | S | 4/1996 | Linner |
| 5,993,843 | A | 11/1999 | Sakurada et al. |
| 6,216,960 | B1 * | 4/2001 | Aiba .................. A01M 1/2044 239/34 |
| 7,055,295 | B1 | 6/2006 | Aiba et al. |
| D721,285 | S | 1/2015 | Saguchi |
| D721,286 | S | 1/2015 | Saguchi |
| 10,117,426 | B2 * | 11/2018 | Saguchi ............. A01M 1/2044 |
| 2003/0116885 | A1 * | 6/2003 | Lessard .................. B29C 66/21 264/249 |
| 2004/0185080 | A1 | 9/2004 | Hojo et al. |
| 2011/0204100 | A1 * | 8/2011 | Nilsson ............... B29C 66/9161 141/18 |

FOREIGN PATENT DOCUMENTS

| | | |
|---|---|---|
| EP | 0 160 151 A2 | 11/1985 |
| EP | 0 233 109 A2 | 8/1987 |
| EP | 0 913 088 A1 | 5/1999 |
| EP | 1 459 626 A | 9/2004 |
| JP | S61-16361 B2 | 4/1986 |
| JP | S62-122801 U | 8/1987 |
| JP | 63-000722 U | 1/1988 |
| JP | H02-63017 B2 | 12/1990 |
| JP | H04-17927 U | 2/1992 |
| JP | H08-1787 A | 1/1996 |
| JP | 11-225646 A | 8/1999 |
| JP | 2004-277342 A | 10/2004 |
| JP | 2009-209482 A | 9/2009 |
| JP | 2009209482 A * | 9/2009 |

OTHER PUBLICATIONS

Extended European Search Report from European Patent Application No. 11759631.2 dated May 8, 2015.
International Preliminary Report on Patentability from International Application No. PCT/JP2011/057513 dated Sep. 25, 2012.
International Search Report from International Application No. PCT/JP2011/057513 dated Apr. 26, 2011.
Office Action from Chinese Patent Application No. 201180015410.8 dated Jul. 1, 2013.

* cited by examiner

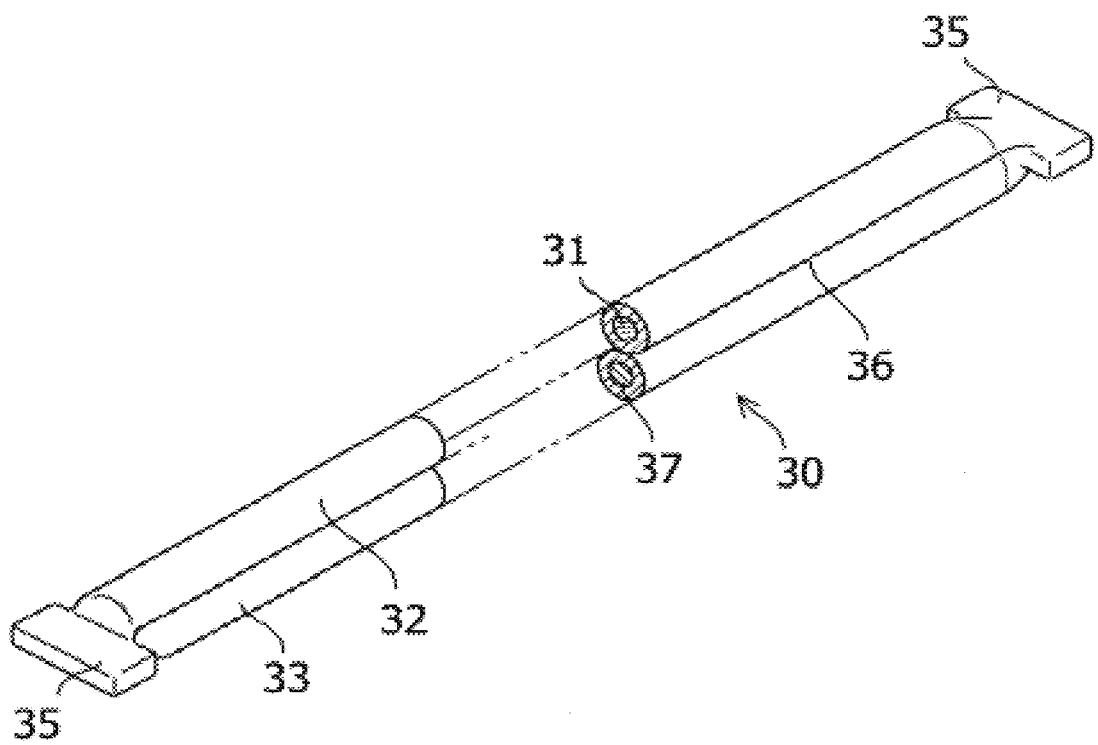
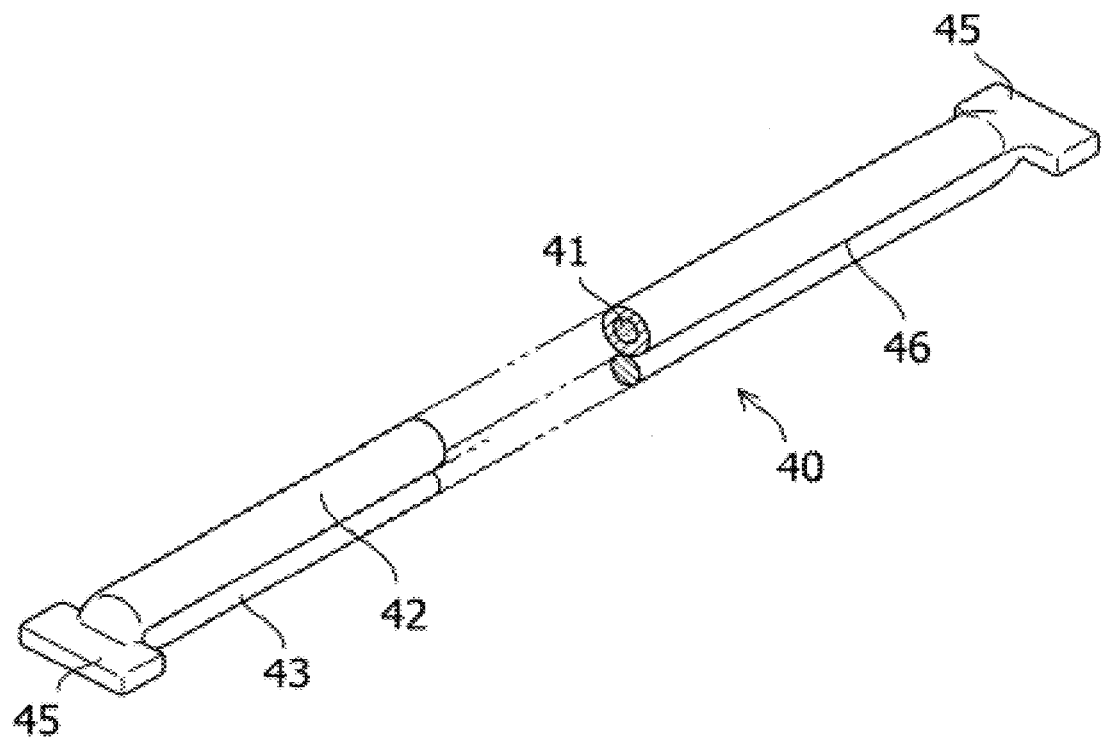

$\alpha = 0°$ $\alpha = 30°$ $\alpha = 45°$ $\alpha_{12} = 0°$
$\alpha_{23} = 0°$ $\alpha_{12} = 30°$
$\alpha_{23} = 30°$ $\alpha_{12} = 30°$
$\alpha_{23} = 30°$
$\alpha_{13} = 90°$

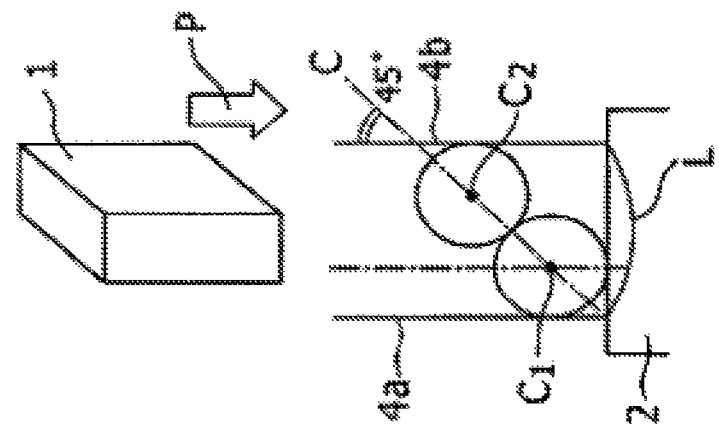
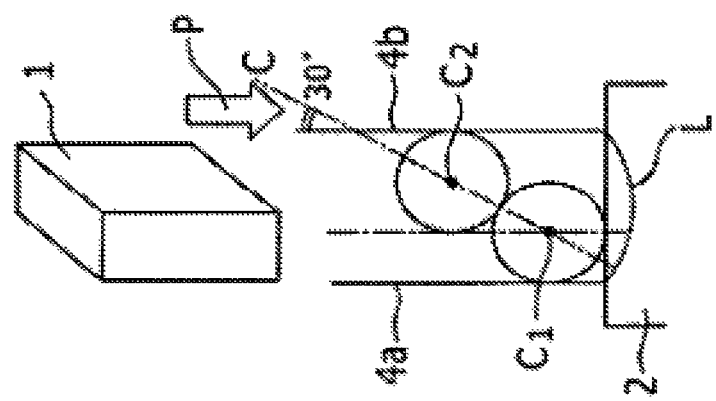
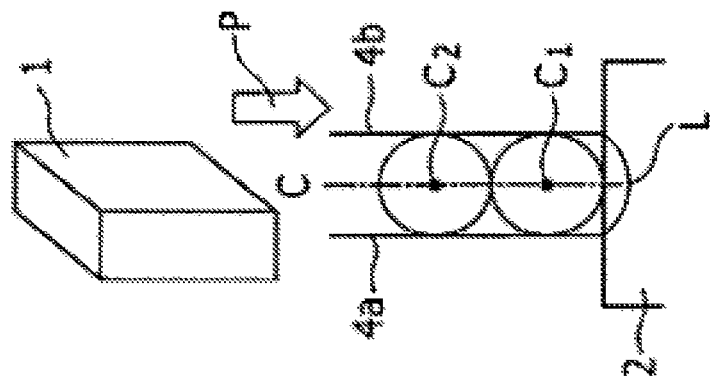

ANNULAR SUSTAINED RELEASE PREPARATION AND PRODUCTION METHOD THEREOF

CROSS REFERENCE TO RELATED APPLICATIONS

This application is a divisional of U.S. application Ser. No. 13/634,734, filed Sep. 13, 2012, which is a national phase entry of International Application No. PCT/JP2011/057513, filed Mar. 22, 2011, which claims priority from Japanese Application No. 2010-067537, filed Mar. 24, 2010, the entire contents of which are incorporated herein by reference

TECHNICAL FIELD

The present invention relates to an annular sustained release preparation for releasing a synthetic pheromone into the air in order to disrupt mating communication of insect pests and thereby controlling them; and a production method of the preparation.

BACKGROUND ART

Control of insect pests through mating disruption is performed by releasing a synthetic pheromone of a target insect pest into the air, disturbing mating communication between male and female insect pests to reduce their mating ratio, and controlling the birth of the next generation. A preparation for releasing this synthetic pheromone is required to have a performance of stably releasing the sex pheromone during an emergence period (for from 2 to 6 months) of the insect pest.

In a sustained release preparation already used in practice, a sex pheromone is enclosed in a polymer tube or a polymer ampoule, and released by diffusion and transmittance through the wall of the tube or ampoule to the air. Examples of the polymer tube include a tube comprising a metal wire along the tube (PTL1 and PTL2), a tube bent into a ring (PTL3), and a folded tube (PTL4). In PTL5, there is proposed an annular sustained release preparation 110 having the ends of two polymer tubes 112 and 113 welded into a ring as shown in FIG. 12. It is hung on or winded around the branch or trunk of a plant upon use.

SUMMARY OF INVENTION

Technical Problem

The preparation is used after opening a center portion of the preparation so that without careful handling, it splits into 115a and 115b at the end 115 as shown in FIG. 13, thereby making the preparation unusable. An object of the invention is therefore to provide an annular sustained release preparation strong enough to prevent cleavage at the welded end.

Solution to Problem

When a plurality of polymer tube materials are sealed under pressure, two of the tube materials adjacent to each other are usually shifted to a lateral direction, that is, a direction of 90° to the pressure application direction. Consequently, they are pressure-welded while being aligned laterally. For example, as shown in FIG. 14, two polymer tube materials 122 and 123 are welded on a sealing table (not shown) while applying a pressure P to them with a sealing pressure block 1. The present inventors have found that in the above method, however, cleavage is likely to occur at the end 115, because the contact area of these two tube materials decreases and their adhesion strength therefore decreases. More specifically, the present inventors have found that when a plurality of polymer tube materials are sealed, a contact area of these tube materials differs so that their adhesion strength greatly differs, depending on an angle between a line connecting the centers $C_1$ and $C_2$ of the tube materials and an application direction of a sealing pressure P. The present inventors have arrived at the invention based on these findings.

The invention provides an annular sustained release preparation comprising at least two polymer tubes having both ends sealed and integrated by pressure-welding, or at least one polymer tube and at least one polymer rod having both ends sealed and integrated by pressure-welding; a sex pheromone liquid contained by at least one of the tubes or the tube; wherein an annular space can be formed by pulling the tubes (or the tube and the rod) apart from each other at a center portion therebetween, the center portion not have been pressure-welded; and an angle formed between a line connecting respective centers of diameters of the tubes welded to each other or the tube and the rod welded to each other and a pressure application direction is from 0 to 45°.

The invention also provides a method for producing an annular sustained release preparation comprising at least the steps of:

placing, between two guides which are disposed on a sealing table, are perpendicular to the sealing table and are parallel to each other with a fixed distance, respective pressure-welding planned portions of at least two polymer materials for tube (which may hereinafter be referred to as "tube-tube materials") aligned in a longitudinal direction or respective pressure-welding planned portions of at least one polymer material for tube and at least one polymer material for rod (which may hereinafter be referred to as "tube-rod materials) aligned in a longitudinal direction, at least one of the tube-tube materials or at least one of the tube-rod materials containing a sex pheromone liquid therein;

welding the tube-tube materials or tube-rod materials between the guides while applying a pressure with a sealing pressure block from a direction parallel to the guides; and cutting the resulting product at the pressure-welded portions to obtain an annular sustained release preparation comprising at least two polymer tubes having both ends sealed and integrated by pressure-welding or at least one polymer tube and at least one polymer rod having both ends sealed and integrated by pressure-welding wherein an annular space can be formed by pulling the tubes (or the tube and the rod) apart from each other at a center portion therebetween, the center portion not have been pressure-welded;

wherein the fixed distance is a length calculated from diameters of the tube-tube materials or the tube-rod materials so that an angle formed between a line connecting respective centers of the diameters of the polymer materials to be welded and the pressure application direction is from 0 to 45°.

Advantageous Effects of Invention

The annular sustained release preparation according to the invention can be easily installed and stably maintained after installation because when it is opened at the center portion between the tubes or the tube and the rod upon use, cleavage due to insufficient weld strength at the welded ends does not easily occur. It is therefore suitable for being hung on or wound around a branch or trunk of a plant.

BRIEF DESCRIPTION OF DRAWINGS

FIG. 3 shows one example of an annular sustained release preparation comprising a polymer tube filled with a sex pheromone liquid and a polymer tube filled with a metal wire.

FIG. 4 shows one example of an annular sustained release preparation comprising a polymer tube and a polymer rod.

FIGS. 9(A), (B) and (C) each shows a relationship between the length of the guide and the angle α in which the angle α is 0° in (A), 30° in (B), and 45° in (C).

DESCRIPTION OF EMBODIMENTS

The invention provides an annular sustained release preparation comprising at least two polymer tubes having both ends sealed and integrated by pressure-welding, and a sex pheromone liquid contained by at least one of the polymer tubes, wherein an annular space can be formed by making an opening at a center portion between the polymer tubes at which they have not been pressure welded.

The annular sustained release preparation may comprise at least two polymer tubes, each tube containing a sex pheromone liquid. It may comprise at least one tube containing a sex pheromone liquid and at least one tube not containing a sex pheromone liquid. The tube not containing a sex pheromone liquid therein may contain a metal wire. The metal wire is flexible and can maintain a fixed shape so that it is suitable for installing the annular sustained release preparation. The metal for the metal wire includes, but not limited to, an aluminum wire, a copper wire and a wire made of an alloy thereof.

Polymer materials used for the at least two polymer tubes may be different from each other insofar as they can be welded while applying a pressure thereto. However, when they are same, the strength of the connected part by a pressure-welding is high and they can be welded easily because they are melted under the same condition.

Figure 1:
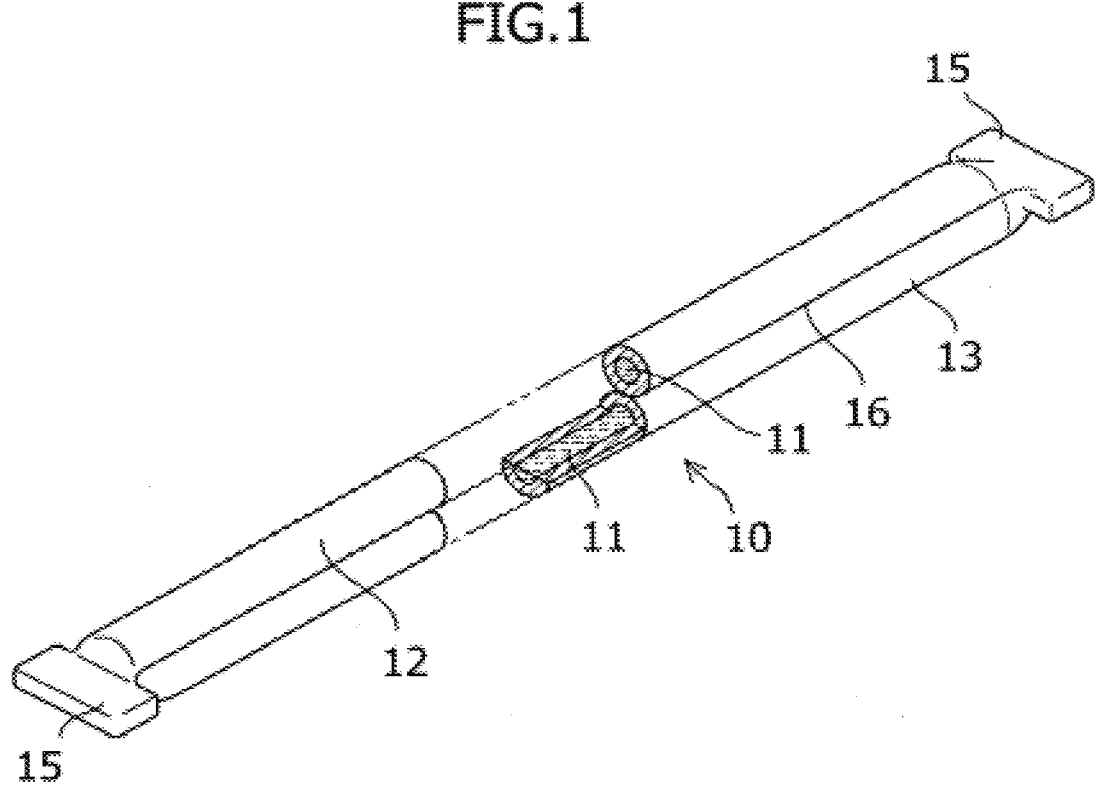
FIG. 1 shows one example of an annular sustained release preparation comprising two polymer tubes.
Figure 2:
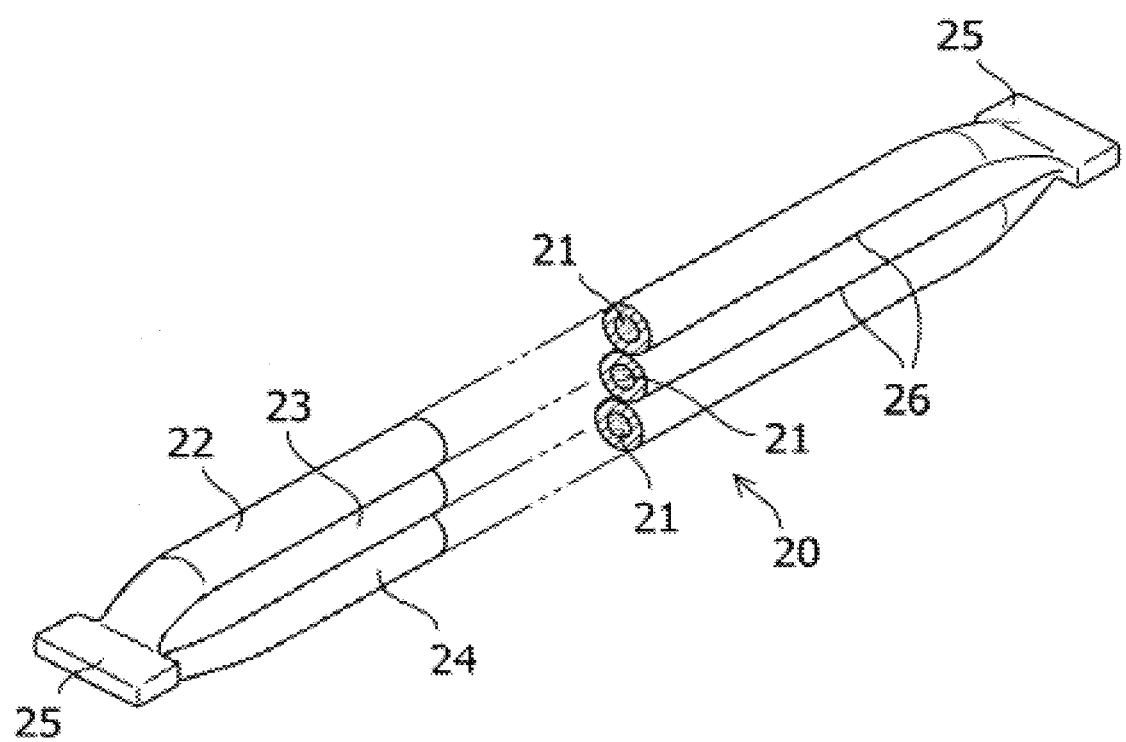
FIG. 2 shows one example of an annular sustained release preparation comprising three polymer tubes.

A specific example of an annular sustained release preparation comprising two polymer tubes, each containing a sex pheromone liquid, is shown in FIG. 1, while a specific example of an annular sustained release preparation comprising three polymer tubes, each containing a sex pheromone liquid, is shown in FIG. 2.

In a sustained release preparation 10 in FIG. 1, a sex pheromone liquid 11 is enclosed in two polymer tubes 12 and 13 which can be deformed semi-elastically. The preparation has ends 15 at which the tubes have been sealed and integrated each other and can form an annular space by pulling the tubes apart from one another at the center portion 16 therebetween. As the sex pheromone liquid 11, a sex pheromone substance of the same kind or sex pheromone substances different in kind may be filled in the two tubes, respectively.

In a sustained release preparation 20 in FIG. 2, a sex pheromone liquid 21 is enclosed in each of three polymer tubes 22, 23 and 24. The preparation has ends 25 at which the tubes have been sealed and integrated each other and can form an annular space by pulling the tubes apart from each other at one or both of the two center portions 26 between them. As the sex pheromone liquid 21, a sex pheromone substance of the same kind or sex pheromone substances different in kind may be filled in the three tubes, respectively.

In an embodiment of the annular sustained release preparation, a polymer tube contains a sex pheromone substance of a certain insect pest and another polymer tube contains a sex pheromone substance of another insect pest so that a plurality of insect pests can be controlled simultaneously. In an embodiment of the annular sustained release preparation, two or more polymer tubes contain the same sex pheromone substance so that a release amount at one place can be increased.

An example of an annular sustained release preparation comprising a polymer tube containing a sex pheromone liquid therein and a polymer tube containing a metal wire therein is shown in FIG. 3.

The sustained release preparation 30 in FIG. 3 comprises a polymer tube 32 containing a sex pheromone liquid 31 therein and a polymer tube 33 containing a metal wire 37 therein, has ends 35 at which the tubes have been sealed and integrated each other, and can form an annular space by pulling the tubes apart from each other at a center portion 36 therebetween.

In the invention, there is also provided an annular sustained release preparation comprising at least one polymer tube and at least one polymer rod which have been sealed and integrated at both ends thereof by pressure-welding, and a sex pheromone liquid contained by the at least one polymer tube, wherein an annular space can be formed by pulling the tube and the rod apart from each other at a center portion therebetween at which they have not been pressure-welded.

It is a modification example of the embodiment in which a tube containing a sex pheromone and a tube not containing a sex pheromone are used in combination, wherein the tube not containing a sex pheromone is replaced by a rod. The rod is advantageous over a tube in strength because the tube is hollow. Different from the tube containing a metal wire therein, the rod does not require covering of a metal wire and can retain a fixed shape, though not so well as the metal wire.

Polymer materials used for the at least one polymer tube and the at least one polymer rod may be different from each other insofar as they permit welding under pressure. However, they are preferably same from the standpoint of strength of the connected portion by the pressure-welding and ease of operation due to melting which occurs under the same state.

An example of the annular sustained release preparation comprising a polymer tube containing a sex pheromone therein and a polymer rod in combination is shown in FIG. 4.

An annular sustained release preparation 40 in FIG. 4 comprises a polymer tube 42 containing a sex pheromone liquid 41 therein and a polymer rod 43, has ends 45 at which they have been sealed and integrated each other, and can form an annular space by pulling them apart from each other at a center portion 46 therebetween.

According to the invention, in the annular sustained release preparation, a line connecting the respective centers of diameters of the at least two polymer tubes or of at least one polymer tube and at least one polymer rod and a pressure application direction of pressure-welding form an angle α of from 0 to 45°. When the angle α is more than 45°, sufficient weld strength cannot be obtained because of a decrease in the contact area between the tube and the tube, or between the tube and the rod.

The angle α during pressure-welding can be confirmed from the shape of the annular sustained release preparation obtained. For example, since the annular sustained release preparation is obtained by being cut at positions where the tube and the tube (or the tube and the rod) have been sealed and integrated by pressure-welding, it usually has remaining melt fragments at both ends thereof. A plane which has been subjected to a pressure becomes flattened and the angle α during pressure-welding can be calculated based on the plane and a shape of the tube and the tube (or the tube and the rod). Even if the remaining fragment is small and the flattened direction is not clear, the direction from which the pressure has been applied remains in the fragment as an internal stress so that it is possible to measure the direction of the internal stress in a known manner and determine the angle α during the pressure-welding. This means that the angle α during the pressure-welding can be a constituent element of the annular sustained release preparation thus obtained.

Figure 5A:
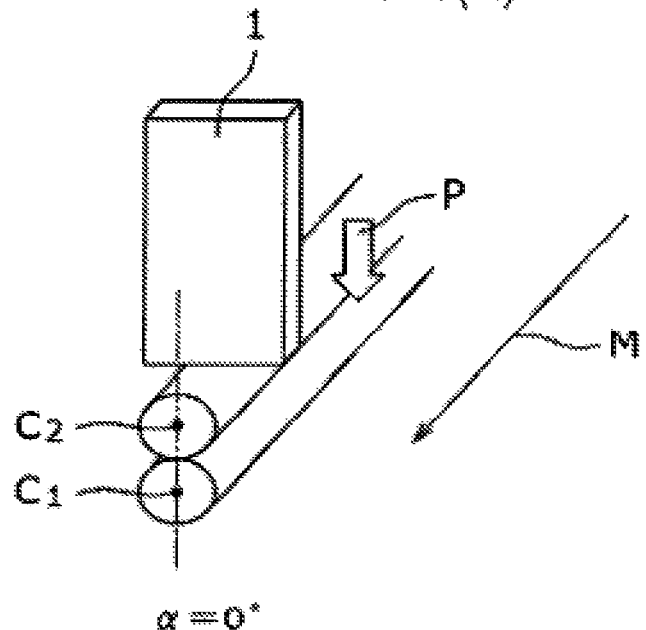
FIGS. 5(A), (B) and (C) show examples of a pressure-welding step of two polymer materials in which an angle α is 0° in (A), 30° in (B), and 45° in (C).
Figure 5B:
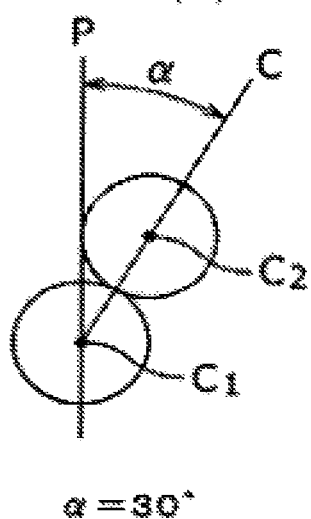
Figure 5C:
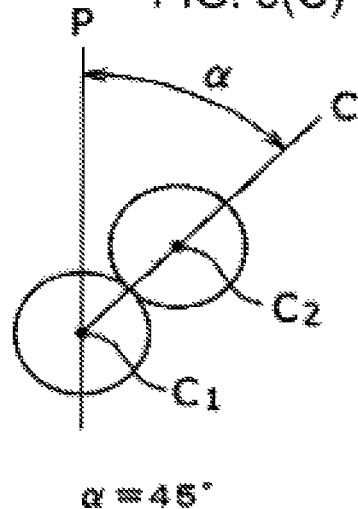

FIGS. 5(A), (B) and (C) shows a line C connecting centers $C_1$ and $C_2$ of the diameters of two polymer materials and a line indicating a direction of pressure P to them with a pressure block 1, these lines forming an angle α. The angle α is 0° in FIG. 5(A), 30° in FIG. 5(B), and 45° in FIG. 5(C). In these drawings, M shows the direction of a pitch feed. The term "polymer material" as used herein may be a polymer material for tube or a polymer material for rod.

Figure 6A:
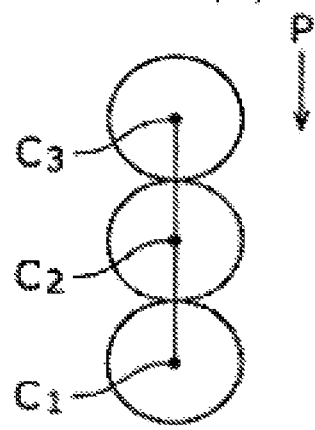
FIGS. 6(A), (B) and (C) show examples of a pressure-welding step of three polymer materials in which two angles α are each 0° in (A), 30° in (B), and 45° in (C).
Figure 6B:
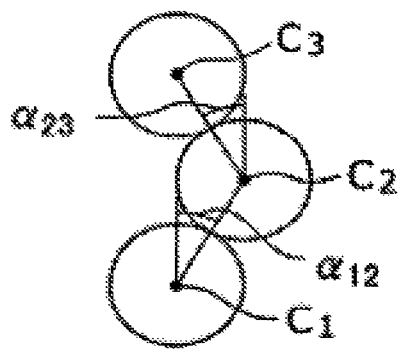
Figure 6C:
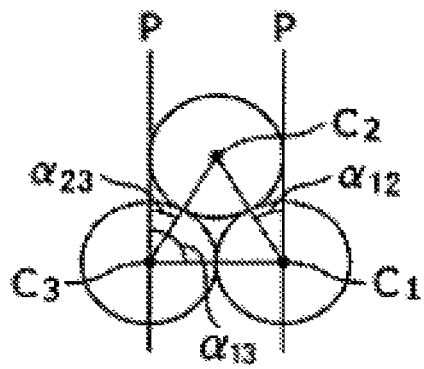

In FIGS. 6(A), 6(B) and 6(C), three polymer materials having centers $C_1$, $C_2$, and $C_3$, respectively, are used, and an angle formed between a line connecting the centers $C_1$ and $C_2$ and a line indicating a pressure application direction is expressed as $\alpha_{12}$, while an angle formed between a line connecting the centers $C_2$ and $C_3$ and a line indicating the pressure application direction is expressed as $\alpha_{23}$. Shown are $\alpha_{12}=0°$ and $\alpha_{\leq}=0°$ in FIG. 6(A), and $\alpha_{12}=30°$ and $\alpha_{23}=30°$ in FIGS. 6(B) and 6(C). In FIG. 6(C), $\alpha_{13}$ which is an angle formed between a line connecting the centers $C_1$ and $C_3$ and a line indicating the pressure application direction is 90° and equal to that of the conventional method, but it poses no problem because the polymer materials having the center $C_1$ and the center $C_3$ are welded firmly with the angles $\alpha_{12}=30°$ and $\alpha_{23}=30°$, respectively, to the polymer material having the center $C_2$.

The annular sustained release preparation of the invention can be produced, for example, as described below.

First, respective pressure-welding portions of at least two polymer materials for tube which have been arranged in a longitudinal direction, or respective pressure welding portions of at least one polymer material for tube and at least one polymer material for rod which have been arranged in a longitudinal direction are placed between guides parallel to each other with a certain distance. The guides are disposed on a sealing table perpendicularly thereto. The guides may be placed on the sealing table, or may be two side walls of a groove of uniform depth made in the sealing table perpendicularly to the surface of the sealing table.

Figure 7:
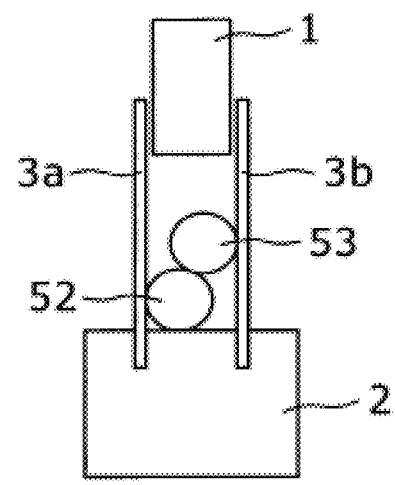
FIG. 7 shows an example of a guide to be used in the pressure-welding step.

FIG. 7 shows guides 3*a* and 3*b* parallel to each other and perpendicular to a sealing table 2. Polymer materials 52 and 53 placed in the guides are pressurized with a sealing pressure block 1 from a direction parallel to the guides.

Figure 8:
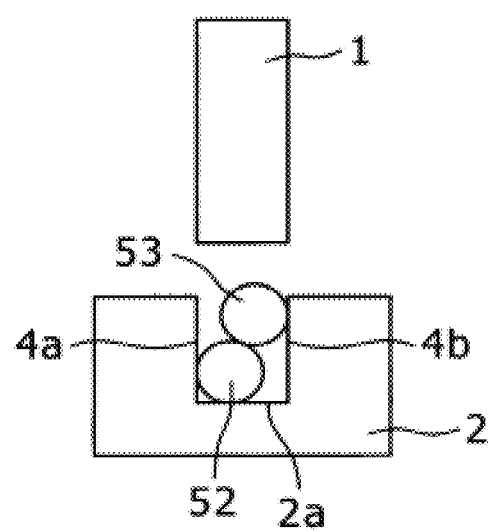
FIG. 8 shows a side wall of a groove made in a sealing table as another example of a guide to be used in the pressure-welding step.

FIG. 8 shows, as guides, side walls 4*a* and 4*b* placed on a bottom surface 2*a* (in a sealing table 2) of the groove of uniform depth made perpendicularly to the surface of the sealing table 2. The bottom surface 2*a* is parallel to the surface of the sealing table 2 in which no groove has been made and an angle formed between the bottom surface 2*a* and each side wall is 90°. The polymer materials 52 and 53 placed in the groove are pressurized with a sealing pressure block 1 from a direction parallel to the guides Next, in order to seal and integrate the polymer materials placed between the guides, the polymer materials between the guides are welded while applying a pressure from a direction parallel to the guides with the sealing pressure block.

A specific sealing method is not particularly limited. The polymer materials are welded, for example, by applying a pressure of from 0.1 to 0.3 MPa to the polymer materials and oscillating them at from 200 to 1500 mmsec with an ultrasonic oscillator of from 20 to 50 μm. Not only ultrasonic sealing but also heat sealing or high-frequency sealing may be employed for joining them. The ultrasonic sealing is suited for hermetic sealing because contaminants on the joining surfaces are dissipated through ultrasonic vibration and the polymer materials can be joined irrespectively of the presence or absence of a pheromone.

Then, the sealed product is cut at the positions where the polymer materials have been sealed and integrated by pressure-welding, leaving respective melted fragments in order to keep the seal and integration. As a result, an annular sustained release preparation can be obtained, the preparation comprising at least two polymer tubes having both ends sealed and integrated by pressure-welding, or at least one polymer tube and at least one polymer rod having both ends sealed and integrated by pressure-welding; and a sex pheromone liquid contained by at least one of the polymer tubes; wherein an annular space can be formed by pulling the tubes (or the tube and the rod) apart from each other at a center portion therebetween which have not been pressure-welded.

The distance between the guides is selected so that the angle α formed between a line connecting the respective centers of the diameters of the polymer materials placed between the guides and the pressure application direction during pressure-welding is from 0 to 45°.

Embodiments of pressure-welding two polymer materials equal in diameter are illustrated in FIGS. 9(A), (B) and (C). FIGS. 9(A), (B) and (C) show a line C connecting centers $C_1$ and $C_2$ of the diameters of two polymer materials each having a radius r and a line indicating a pressure application direction with a pressure block 1, these lines forming an angle α. The angle α can be adjusted to 0° by setting a distance L between the guides 4a and 4b to 2r as shown in FIG. 9(A); the angle α can be adjusted to 30° by setting a distance L between the guides to 3r as shown in FIG. 9(B); and the angle α can be adjusted to 45° by adjusting a distance L between the guides to (2+√2)r. Incidentally, √2 means a square root of 2 and is approximately 1.4. The angle α can thus be adjusted to from 0 to 45° by placing the polymer materials between the guides which are disposed perpendicularly to a sealing table and are parallel to each other with a distance of from 2 to 3.4 times as much as the distance of radius r.

The two polymer materials each having a radius of r as shown in FIGS. 9(A), (B) and (C) include two polymer materials for tube having the same radius r, and a combination of a polymer material for tube and a polymer material for rod each having the same radius r.

Even if the two polymer materials have respectively different radii, the distance of the guides giving the angle α of from 0 to 45° can be selected according to the similar calculation.

Even if three or more polymer materials are pressure-welded, when they are placed for aligning the respective centers of all the diameters in line, the distance of the guides giving the angle α of from 0 to 45° can be selected according to the similar calculation whether the radii of the three materials may be the same or different.

When three or more polymer materials are pressure-welded and the respective centers of all the diameters are not aligned in line, a desirable layout of the three or more polymer materials is drawn and the distance between the guides is calculated based on the layout. When the three or more polymer materials contain an extremely thin polymer material or an extremely thick polymer material, a desired angle α may not be obtained in theory due to movement of the tubes or rods between the guides during application of a pressure. However, in practice, there is neither utility nor necessity of polymer materials having extremely different sizes.

Further, setting the distance between the guides to be equal to the largest diameter of the diameters of the polymer materials is preferred because the angle α can be maintained around 0°, thereby eliminating the possibility of the angle α falling outside the range of from 0 to 45° even if a polymer material on the polymer material having the largest diameter slides during pressure-welding.

It is also preferred to dispose a retainer which is, for example, formed by changing a metal wire or the like into a desired shape, just upstream or downstream of the guides in order to prevent the polymer material between the guides from sliding during pressure application.

The length of the guides, that is, the length of the guides in a longitudinal direction of the polymer materials is usually from 2 to 8 mm. The pressure-welded portion becomes longer than the length of the guides because the polymer extends by pressure-welding. For example, use of a guide having a length of 5 mm results in a welded portion of about 8 mm long.

Examples of the polymer material include thermoplastics such as low density polyethylene, high density polyethylene, polypropylene, ethylene-propylene copolymer, ethylene-vinyl acetate copolymer, ethylene-acrylate copolymer, polyvinyl acetate, polyvinyl chloride, polystyrene, polyamide, polycarbonate, polyvinylidene chloride, polybutylene, methyl methacrylate-styrene copolymer, polyacetal, cellulose acetate, cellulose acetate butylate, polyvinylidene fluoride and silicon resin. They also include condensation polymers made from at least one dicarboxylic acid selected from the group consisting of oxalic acid, malonic acid, succinic acid, glutaric acid, adipic acid, sebacic acid, fumaric acid and maleic acid, and at least one polyol selected from the group consisting of ethylene glycol, propylene glycol, butanediol, pentanediol, hexanediol, octanediol and decanediol; condensation polymers of at least one selected from the group consisting of lactic acid, hydroxyvaleric acid, hydroxycaproic acid and hydroxycapric acid; and aliphatic polyester type thermoplastics such as polycaprolactone.

A lubricant, a plasticizer, a stabilizer, a pigment and/or a filler may be added to these polymers.

The polymer material for tube which contains a sex pheromone therein can be produced by continuous processing such as extrusion. It has an inner diameter of preferably from 0.4 to 2 mm, more preferably from 0.6 to 1.6 mm and has a wall thickness of preferably from 0.2 to 1.5 mm, more preferably from 0.25 to 0.8 mm. An elongated polymer material is preferred. When a polymer material for tube has an inner diameter less than 0.4 mm, it is technically difficult to be formed and it may be difficult to fill the tube with a synthetic liquid pheromone. A tube having an inner diameter greater than 2 mm can be filled with a large amount of a synthetic liquid pheromone, but the amount may be excessive. The wall thickness of the polymer material for tube has a large influence on the diffusion rate of a synthetic pheromone through a polymer membrane. When the polymer material for tube has a wall thickness less than 0.2 mm, it may be difficult to be formed. When the polymer material for tube has a wall thickness greater than 1.5 mm, the diffusion rate of a synthetic pheromone may be reduced excessively and the productivity may be lowered due to a large amount of extrusion resin.

As the polymer material for tube which contains a metal wire therein and the polymer material for rod, the same materials as the above polymer materials can be employed. They may be the same or different from the polymer materials for tube which contains a sex pheromone therein. The outside diameter of the polymer material for tube which contains a metal wire therein and the outside diameter of the polymer material for rod may be preferably equal to or smaller than the outside diameter of the tube which contains a sex pheromone therein. More preferably, they may be reduced by 20% or less in comparison with the outside diameter of the tube which contains a sex pheromone therein.

The effective length of the annular sustained release pheromone preparation according to the invention is preferably from 100 to 2000 mm, more preferably from 200 to 1500 mm. When the preparation has an effective length less than 100 mm, it may be difficult to be installed because of an excessively small diameter of the annular preparation. When the preparation has an effective length exceeding 2000 mm, it may be unsuited for transport or packaging and may be too large to be pulled apart into a ring by hands.

As the polymer tube containing a sex pheromone liquid therein, hollow tube or tube comprising a porous inner layer having pores communicated to each other and an outer layer through which the sex pheromone liquid penetrates can be used. From the standpoint of uniform release of the sex pheromone liquid, the latter is preferred.

The present invention will hereinafter be described in detail. It should not be construed that the present invention is limited to or by them.

Example 1

Two polymer materials for tube having an inner diameter of 1.10 mm and a wall thickness of 0.50 mm were prepared by extruding an ethylene-vinyl acetate copolymer. A synthetic pheromone liquid of a leaf roller was then filled in these polymer materials under pressure. The resulting two polymer materials were then placed between guides provided with a distance of 2.2 mm and were subjected to ultrasonic sealing with an aluminum block having a width of 5 mm at a pitch distance of 204 mm. A sustained release preparation was obtained by cutting the sealed product at the sealed parts.

Incidentally, ultrasonic sealing was performed such that an angle between a pressure application direction with the aluminum block and a line connecting the respective centers of the two polymer materials was 0° (meaning that they had the same direction).

Comparative Example 1

Two polymer materials for tube having an inner diameter of 1.10 mm and a wall thickness of 0.50 mm were prepared by extruding an ethylene-vinyl acetate copolymer. A synthetic pheromone liquid of a leaf roller was then filled in these polymer materials under pressure. The resulting two polymer materials were placed between guides provided with a distance of 4.6 mm and were subjected to ultrasonic sealing with an aluminum block having a width of 5 mm at a pitch distance of 204 mm. A sustained release preparation was obtained by cutting the sealed product at the sealed parts.

Incidentally, ultrasonic sealing was performed such that an angle α between a pressure application direction with the aluminum block and a line connecting the respective centers of the two polymer materials was 90°.

Example 2

Two polymer materials for tube having an inner diameter of 0.80 mm and a wall thickness of 0.35 mm were prepared by extruding a copolymer which is a condensation polymer of adipic acid (a dicarboxylic acid) and butanediol. A synthetic pheromone liquid of an oriental fruit moth was then filled in the polymer materials under pressure. The resulting two polymer materials were placed between guides provided with a distance of 1.6 mm and were subjected to ultrasonic sealing with an aluminum block having a width of 5 mm at a pitch distance of 2204 mm. A sustained release preparation was obtained by cutting the sealed product at the sealed parts.

Incidentally, ultrasonic sealing was performed by placing the two tubes in a groove having a width of 3.76 mm and a depth of 5.0 mm made in a sealing table and then applying a pressure with a sealing aluminum block provided with a clearance to the groove. In this case, an angle between a line connecting the respective centers of the two tubes and a pressure application direction was 45°.

Example 3

Two polymer materials for tube having an inner diameter of 0.80 mm and a wall thickness of 0.35 mm were prepared by extruding a copolymer which is a condensation polymer of adipic acid (a dicarboxylic acid) and butanediol. A synthetic pheromone liquid of an oriental fruit moth was then filled in the polymer materials under pressure. The resulting two polymer materials were placed between guides provided with a distance of 2.25 mm and were subjected to ultrasonic sealing with an aluminum block having a width of 5 mm at a pitch distance of 2204 mm. A sustained release preparation was obtained by cutting the sealed product at the sealed parts.

Incidentally, ultrasonic sealing was performed by placing the two tubes in a groove having a width of 2.3 mm and a depth of 5.0 mm made in a sealing table and then applying a pressure with a sealing aluminum block provided with a clearance to the groove. In this case, an angle between a line connecting the respective centers of the two tubes and a pressure application direction was 30°.

Comparative Example 2

Two polymer materials for tube having an inner diameter of 0.80 mm and a wall thickness of 0.35 mm were prepared by extruding a copolymer which is a condensation polymer of adipic acid (a dicarboxylic acid) and butanediol. A synthetic pheromone liquid of an oriental fruit moth was then filled in these polymer materials under pressure. The resulting two polymer materials were aligned and were subjected to ultrasonic sealing with an aluminum block having a width of 5 mm at a pitch distance of 204 mm. A sustained release preparation was obtained by cutting the sealed product at the sealed parts.

Figure 10:
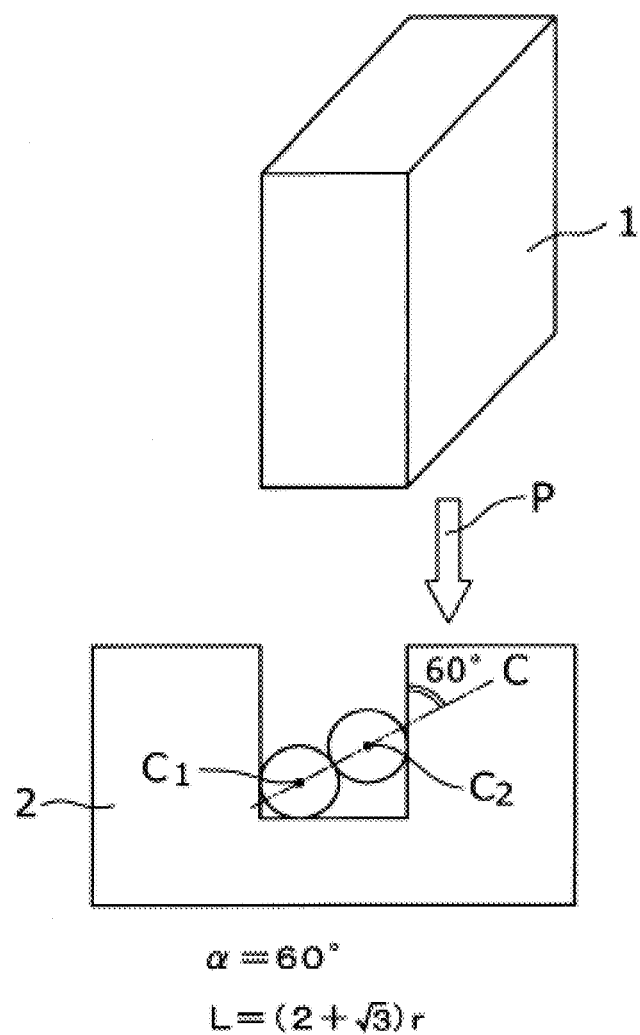
FIG. 10 shows an embodiment in Comparative Example 1 in which a line connecting the respective centers of the polymer materials and a pressure application direction form an angle of 60°.

Incidentally, ultrasonic sealing was performed by placing the two tubes in a groove having a width of 4.10 mm and a depth of 5.0 mm made in a sealing table and then applying a pressure with a sealing aluminum block provided with a clearance to the groove. In this case, an angle formed between a line connecting the respective centers of the two tubes and a pressure application direction was 60° (FIG. 10).

Figure 11:
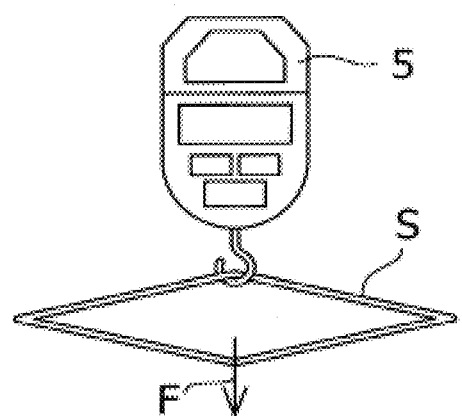
FIG. 11 shows a method for measuring cleavage strength of the sealed ends.
Figure 12:
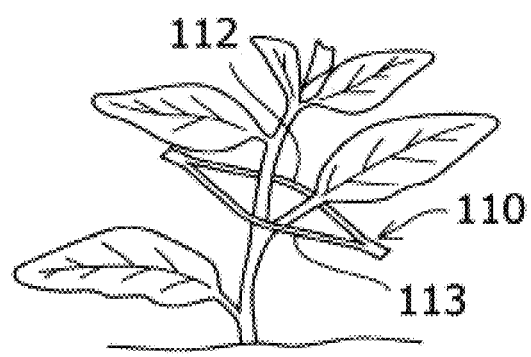
FIG. 12 shows an application example of a conventional annular sustained release preparation.
Figure 13:
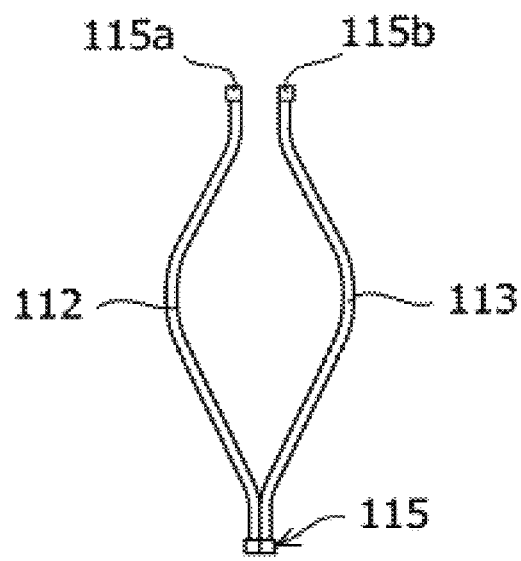
FIG. 13 shows the conventional annular sustained release preparation having cleavage at the sealed end.
Figure 14:
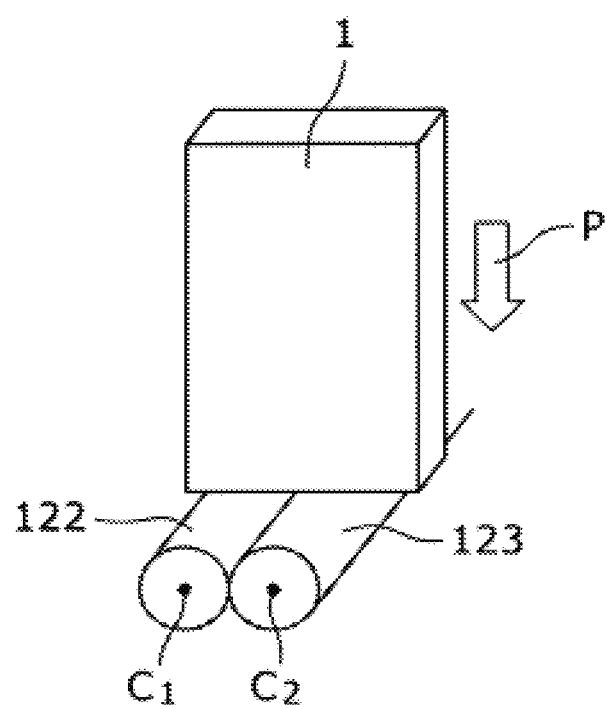
FIG. 14 shows a pressure-welding step of two polymer materials for producing the conventional annular sustained release preparation.

Strength against the cleavage of the sustained release preparations obtained in Examples 1 to 3 and Comparative Examples 1 and 2 was measured using a method shown in FIG. 11. More specifically, a digital balance 5 was connected to the center portion of a sustained release preparation (Sample S), applying a tensile force F so as to pull Sample S apart at the center portion thereof, and measure a load at the time when cleavage occurred at the welded end of the sample. Measurement was conducted 20 times and average, maximum, and minimum values are shown in Table 1.

TABLE 1

| | | load of cleavage at the welded end | | |
| --- | --- | --- | --- | --- |
| | angle α (degree) | maximum (kg) | minimum (kg) | average (n = 20) (kg) |
| Example 1 | 0 | 2.7 | 0.95 | 1.83 |
| Example 2 | 45 | 2.3 | 0.70 | 1.50 |
| Example 3 | 30 | 1.6 | 0.70 | 1.20 |
| Comp. Ex. 1 | 90 | 1.5 | 0.25 | 0.69 |
| Comp. Ex. 2 | 60 | 1.0 | 0.10 | 0.40 |

The results in Table 1 have revealed that the annular sustained release preparations obtained by adjusting the angle α formed between a pressure application direction with an aluminum block and a line connecting the respective centers of two tubes to 0°, 30° and 45°, respectively, have higher strength against cleavage than those obtained by adjusting the angle α to 60° and 90°. Particularly when the angle α is adjusted to 0°, that is, when the pressure application direction with an aluminum block and the direction of aligning the two tubes are same, the strength against cleavage becomes the maximum.

REFERENCE SIGNS LIST

1 Pressure block
2 Sealing table

2a Bottom surface
3a, 3b Guide
4a, 4b Side wall
5 Digital balance
10, 20, 30, 40, 110 Sustained release preparation
11, 21, 31, 41 Sex pheromone liquid
12, 13, 22, 23, 24, 32, 33, 42, 112, 113 Polymer tube
15, 25, 35, 45, 115, 115a, 115b End
16, 26, 36, 46 Center portion
37 Metal wire
43 Polymer rod
52, 53, 122, 123 Polymer material
$\alpha$, $\alpha_{12}$, $\alpha_{23}$ Angle
C Line
C1, C2, C3 Center
F Tensile force
L Distance
M Direction of pitch feed
P Pressure
R Radius
S Sample

The invention claimed is:

1. A method for producing an annular sustained release preparation comprising at least the steps of:
    placing, between two guides which are disposed on a sealing table, are perpendicular to the sealing table and are parallel to each other with a fixed distance, respective pressure-welding planned portions of at least two polymer materials for tube (which will hereinafter be referred to as "tube-tube materials") aligned in a longitudinal direction or respective pressure-welding planned portions of at least one polymer material for tube and at least one polymer material for rod (which will hereinafter be referred to as "tube-rod materials) aligned in a longitudinal direction, at least one of the tube-tube materials or at least one of the tube-rod materials containing a sex pheromone liquid therein;
    welding the tube-tube materials or tube-rod materials between the guides while applying a pressure with a sealing pressure block from a direction parallel to the guides; and
    cutting the resulting product at the pressure-welded portions to obtain an annular sustained release preparation comprising at least two polymer tubes having both ends sealed and integrated by pressure-welding or at least one polymer tube and at least one polymer rod having both ends sealed and integrated by pressure-welding wherein an annular space can be formed by pulling the tubes or the tube and the rod apart from each other at a center portion therebetween, the center portion not having been pressure-welded;
    wherein the fixed distance is a length calculated from diameters of the tube-tube materials or the tube-rod materials so that an angle formed between a line connecting respective centers of the diameters of the materials to be welded and the pressure application direction is from 30 to 45°.

2. The method for producing an annular sustained release preparation according to claim 1, wherein said guides are sidewalls of a groove of uniform depth made in the sealing table perpendicularly to the surface of the sealing table.

3. The method for producing an annular sustained release preparation according to claim 1, wherein the fixed distance is equal to the largest diameter among the diameters of the tube-tube materials or the tube-rod materials.

* * * * *